US007051923B2

(12) United States Patent
Nguyen et al.

(10) Patent No.: US 7,051,923 B2
(45) Date of Patent: May 30, 2006

(54) METHOD AND SYSTEM FOR PROVIDING INTERACTIVE CARDHOLDER REWARDS IMAGE REPLACEMENT

(75) Inventors: Loc Nguyen, San Francisco, CA (US); Bryan Shimko, Scottsdale, AZ (US); Liane Redford, San Mateo, CA (US); James G. Gordon, Eastwood (AU); Kim Madore, Markham (CA); Marc Black, St. Paul, MN (US); James Mazour, St. Louis Park, MN (US); Michael Salters, Plymouth, MN (US); Glenda Berg, Apple Valley, MN (US)

(73) Assignee: Visa U.S.A., Inc., San Francisco, CA (US)

(*) Notice: Subject to any disclaimer, the term of this patent is extended or adjusted under 35 U.S.C. 154(b) by 149 days.

(21) Appl. No.: 10/661,380

(22) Filed: Sep. 12, 2003

(65) Prior Publication Data

US 2005/0058427 A1    Mar. 17, 2005

(51) Int. Cl.
*G06F 17/00* (2006.01)
(52) U.S. Cl. ...................... 235/375; 235/380
(58) Field of Classification Search ........... 235/376, 235/379, 380, 383; 705/65, 68, 70, 75, 14, 705/21, 35–43
See application file for complete search history.

(56) References Cited

U.S. PATENT DOCUMENTS 3,935,933 A    2/1976 Tanaka et al.

(Continued)

FOREIGN PATENT DOCUMENTS

AU    200039412 A1    12/2000

(Continued)

OTHER PUBLICATIONS

"Internet based secure transactions using encrypting applets and cgl-scripts Independent of browser or server capabilities"; 1998, *IBM Research Disclosure*, No. 410116, pp. 800-801.

*Primary Examiner*—Daniel Stcyr
(74) *Attorney, Agent, or Firm*—Townsend and Townsend and Crew LLP

(57) ABSTRACT

A system for facilitating image management for portable devices includes a host configured to maintain information relating to a first portable device, and a second portable device and an interface device configured to communicate with the host and the first and second portable devices. The interface device includes control logic configured to: determine whether the first portable device is valid for image synchronization using information provided by the host; and if it is determined that the first portable device is valid for image synchronization, record an image of the first portable device, determine whether the second portable device is valid for image synchronization, and download an image of the first portable device to the second portable device if it is determined that the second portable device is valid for image synchronization. The interface device further includes control logic configured to: determine whether the second portable device is valid for image replacement using information provided by the host, and if it is determined that the second portable device is valid for image replacement, retrieve an image of the first portable device and download the retrieved image to the second portable device. The interface device also includes control logic configured to: determine whether the second portable device includes additional information that is not included in the image of the first portable device, and if it is determined that the second portable device includes the additional information, concatenate the additional information with the image of the first portable device, and download the concatenated additional information and image of the first portable device onto the second portable device. The interface device concatenates the additional information and the image of the first portable device based on a set of conflict resolution rules.

53 Claims, 3 Drawing Sheets

U.S. PATENT DOCUMENTS

| | | |
|---|---|---|
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,162,638 A * | 11/1992 | Diehl et al. ................ 235/380 |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,691,525 A * | 11/1997 | Aoki et al. ................ 235/379 |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,546 A * | 6/1998 | Handelman et al. ........ 380/227 |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,854,581 A * | 12/1998 | Mori et al. ................ 235/379 |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |

| | | | | | | |
|---|---|---|---|---|---|---|
| 5,958,174 | A | 9/1999 | Ramsberg et al. | 6,243,688 | B1 | 6/2001 | Kalina |
| 5,960,082 | A | 9/1999 | Haenel | 6,244,958 | B1 | 6/2001 | Acres |
| 5,963,917 | A | 10/1999 | Ogram | 6,266,647 | B1 | 7/2001 | Fernandez |
| 5,969,318 | A | 10/1999 | Mackenthun | 6,267,263 | B1 | 7/2001 | Emoff et al. |
| 5,970,469 | A | 10/1999 | Scroggie et al. | 6,269,158 | B1 | 7/2001 | Kim |
| 5,974,399 | A | 10/1999 | Giuliani et al. | 6,279,112 | B1 | 8/2001 | O'Toole, Jr. et al. |
| 5,974,549 | A | 10/1999 | Golan | 6,282,516 | B1 | 8/2001 | Giuliani |
| 5,978,013 | A | 11/1999 | Jones et al. | 6,292,785 | B1 | 9/2001 | McEvoy et al. |
| 5,987,795 | A | 11/1999 | Wilson | 6,292,786 | B1 | 9/2001 | Deaton et al. |
| 5,997,042 | A | 12/1999 | Blank | 6,296,191 | B1 | 10/2001 | Hamann et al. |
| 6,000,608 | A | 12/1999 | Dorf | 6,299,530 | B1 | 10/2001 | Hansted et al. |
| 6,002,771 | A | 12/1999 | Nielsen | 6,321,208 | B1 | 11/2001 | Barnett et al. |
| 6,003,113 | A | 12/1999 | Hoshino | 6,385,723 | B1 | 5/2002 | Richards |
| 6,003,134 | A | 12/1999 | Kuo et al. | 6,390,374 | B1 | 5/2002 | Carper et al. |
| 6,005,942 | A | 12/1999 | Chan et al. | 6,480,935 | B1 | 11/2002 | Carper et al. |
| 6,009,411 | A | 12/1999 | Kepecs | 6,549,773 | B1 | 4/2003 | Linden et al. |
| 6,012,635 | A | 1/2000 | Shimada et al. | 6,549,912 | B1 | 4/2003 | Chen |
| 6,014,634 | A | 1/2000 | Scroggie et al. | 6,612,490 | B1 | 9/2003 | Herrendoerfer et al. |
| 6,024,286 | A | 2/2000 | Bradley et al. | 6,681,995 | B1 | 1/2004 | Sukeda et al. |
| 6,035,280 | A | 3/2000 | Christensen | 6,689,345 | B1 | 2/2004 | Jager Lezer |
| 6,038,551 | A | 3/2000 | Barlow et al. | 2002/0002468 | A1 | 1/2002 | Spagna et al. |
| 6,041,309 | A | 3/2000 | Laor | 2002/0076051 | A1 | 6/2002 | Nii |
| 6,047,325 | A | 4/2000 | Jain et al. | 2002/0107797 | A1* | 8/2002 | Combaluzier ................ 705/41 |
| 6,049,778 | A | 4/2000 | Walker et al. | | | | |
| 6,052,468 | A | 4/2000 | Hillhouse | | FOREIGN PATENT DOCUMENTS | | |
| 6,052,690 | A | 4/2000 | de Jong | | | | |
| 6,052,785 | A | 4/2000 | Lin et al. | BE | 1002756 | A6 | 5/1991 |
| 6,055,509 | A | 4/2000 | Powell | CA | 2293944 | | 8/2000 |
| 6,061,660 | A | 5/2000 | Eggleston et al. | CA | 2267041 | | 9/2000 |
| 6,067,526 | A | 5/2000 | Powell | CA | 2317138 | A1 | 1/2002 |
| 6,070,147 | A | 5/2000 | Harms et al. | DE | 19522527 | A1 | 1/1997 |
| 6,073,238 | A | 6/2000 | Drupsteen | DE | 19848712 | A1 | 4/2000 |
| 6,076,068 | A | 6/2000 | DeLapa et al. | DE | 19960978 | A1 | 8/2000 |
| 6,076,069 | A | 6/2000 | Laor | DE | 10015103 | A1 | 10/2000 |
| 6,089,611 | A | 7/2000 | Blank | EP | 0203424 | A2 | 12/1986 |
| 6,094,656 | A | 7/2000 | De Jong | EP | 0292248 | A2 | 11/1988 |
| 6,101,422 | A | 8/2000 | Furlong | EP | 0475837 | A1 | 3/1992 |
| 6,101,477 | A | 8/2000 | Hohle et al. | EP | 0540095 | A1 | 5/1993 |
| 6,105,002 | A | 8/2000 | Powell | EP | 0658862 | A2 | 6/1995 |
| 6,105,865 | A | 8/2000 | Hardesty | EP | 0675614 | A1 | 10/1995 |
| 6,105,873 | A | 8/2000 | Jeger | EP | 0682327 | A2 | 11/1995 |
| 6,112,987 | A | 9/2000 | Lambert et al. | EP | 0875841 | A2 | 11/1998 |
| 6,112,988 | A | 9/2000 | Powell | EP | 0936530 | A1 | 8/1999 |
| 6,119,933 | A | 9/2000 | Wong et al. | EP | 0938050 | A2 | 8/1999 |
| 6,119,945 | A | 9/2000 | Muller et al. | EP | 0938051 | A2 | 8/1999 |
| 6,122,631 | A | 9/2000 | Berbec et al. | EP | 0944007 | A2 | 9/1999 |
| 6,129,274 | A | 10/2000 | Suzuki | EP | 0949595 | A2 | 10/1999 |
| 6,138,907 | A * | 10/2000 | Mori et al. ................ 235/379 | EP | 0982692 | A2 | 3/2000 |
| 6,144,948 | A | 11/2000 | Walker et al. | EP | 0984404 | A2 | 3/2000 |
| 6,151,586 | A | 11/2000 | Brown | EP | 1085395 | A2 | 3/2001 |
| 6,151,587 | A | 11/2000 | Matthias | EP | 1102320 | A1 | 5/2001 |
| 6,154,751 | A | 11/2000 | Ault et al. | EP | 1111505 | A1 | 6/2001 |
| 6,161,870 | A | 12/2000 | Blank | EP | 1113387 | A2 | 7/2001 |
| 6,164,549 | A | 12/2000 | Richards | EP | 1113407 | A2 | 7/2001 |
| 6,170,061 | B1 | 1/2001 | Beser | EP | 1168137 | A1 | 1/2002 |
| 6,173,269 | B1 | 1/2001 | Solokl et al. | EP | 1233333 | A1 | 8/2002 |
| 6,173,891 | B1 | 1/2001 | Powell | FR | 2772957 | A1 | 6/1999 |
| 6,179,205 | B1 | 1/2001 | Sloan | FR | 2793048 | A1 | 11/2000 |
| 6,179,710 | B1 | 1/2001 | Sawyer et al. | FR | 2794543 | A1 | 12/2000 |
| 6,183,017 | B1 | 2/2001 | Najor et al. | FR | 2796176 | A1 | 1/2001 |
| 6,185,541 | B1 | 2/2001 | Scroggie et al. | FR | 2804234 | A1 | 7/2001 |
| 6,189,100 | B1 | 2/2001 | Barr et al. | GB | 2331381 | A | 5/1999 |
| 6,189,787 | B1 | 2/2001 | Dorf | GB | 2343091 | A | 4/2000 |
| 6,195,666 | B1 | 2/2001 | Schneck et al. | GB | 2351379 | A | 12/2000 |
| 6,210,276 | B1 | 4/2001 | Mullins | GB | 2355324 | A | 4/2001 |
| 6,216,014 | B1 | 4/2001 | Proust et al. | JP | 2000-112864 | A | 4/2000 |
| 6,216,204 | B1 | 4/2001 | Thiriet | JP | 2000-181764 | A | 6/2000 |
| 6,220,510 | B1 | 4/2001 | Everett et al. | JP | 2001-202484 | A | 7/2001 |
| 6,222,914 | B1 | 4/2001 | McMullin | JP | 2001-236232 | A | 8/2001 |
| 6,230,143 | B1 | 5/2001 | Simons et al. | KR | 0039297 | A | 5/2001 |
| 6,237,145 | B1 | 5/2001 | Narasimhan et al. | KR | 0044823 | A | 6/2001 |
| 6,241,287 | B1 | 6/2001 | Best et al. | KR | 0058742 | A | 7/2001 |
| 6,243,687 | B1 | 6/2001 | Powell | KR | 0021237 | A | 3/2002 |

| | | | | | | |
|---|---|---|---|---|---|---|
| WO | WO 90/16126 A1 | 12/1990 | | WO | WO 01/08087 A1 | 2/2001 |
| WO | WO 96/25724 A1 | 8/1996 | | WO | WO 01/13572 A1 | 2/2001 |
| WO | WO 96/38945 A1 | 12/1996 | | WO | WO 01/15397 A1 | 3/2001 |
| WO | WO 96/42109 A1 | 12/1996 | | WO | WO 01/18633 A1 | 3/2001 |
| WO | WO 97/05582 A1 | 2/1997 | | WO | WO 01/18746 A1 | 3/2001 |
| WO | WO 97/10562 A1 | 3/1997 | | WO | WO 01/29672 A1 | 4/2001 |
| WO | WO 97/39424 A1 | 10/1997 | | WO | WO 01/33390 A2 | 5/2001 |
| WO | WO 98/02834 A1 | 1/1998 | | WO | WO 01/40908 A2 | 6/2001 |
| WO | WO 98/09257 A1 | 3/1998 | | WO | WO 01/42887 A2 | 6/2001 |
| WO | WO 98/20465 A1 | 5/1998 | | WO | WO 01/44900 A2 | 6/2001 |
| WO | WO 98/43169 A2 | 10/1998 | | WO | WO 01/44949 A2 | 6/2001 |
| WO | WO 98/43212 A1 | 10/1998 | | WO | WO 01/47176 A1 | 6/2001 |
| WO | WO 98/52153 A2 | 11/1998 | | WO | WO 01/50229 A2 | 7/2001 |
| WO | WO 99/10824 A1 | 3/1999 | | WO | WO 01/52575 A1 | 7/2001 |
| WO | WO 99/16030 A1 | 4/1999 | | WO | WO 01/55955 A1 | 8/2001 |
| WO | WO 99/19846 A2 | 4/1999 | | WO | WO 01/59563 A1 | 8/2001 |
| WO | WO 99/44172 A1 | 9/1999 | | WO | WO 01/61620 A1 | 8/2001 |
| WO | WO 99/45507 A1 | 9/1999 | | WO | WO 01/65545 A2 | 9/2001 |
| WO | WO 99/49415 A2 | 9/1999 | | WO | WO 01/67694 A1 | 9/2001 |
| WO | WO 99/49426 A1 | 9/1999 | | WO | WO 01/71648 A2 | 9/2001 |
| WO | WO 00/39714 A1 | 7/2000 | | WO | WO 01/71679 A2 | 9/2001 |
| WO | WO 00/46665 A2 | 8/2000 | | WO | WO 01/73530 A2 | 10/2001 |
| WO | WO 00/54507 A1 | 9/2000 | | WO | WO 01/73533 A1 | 10/2001 |
| WO | WO 00/57315 A2 | 9/2000 | | WO | WO 01/78020 A1 | 10/2001 |
| WO | WO 00/57613 A1 | 9/2000 | | WO | WO 01/80563 A1 | 10/2001 |
| WO | WO 00/62265 A1 | 10/2000 | | WO | WO 01/84377 A2 | 11/2001 |
| WO | WO 00/62472 A1 | 10/2000 | | WO | WO 01/84474 A2 | 11/2001 |
| WO | WO 00/67185 A1 | 11/2000 | | WO | WO 01/84512 A1 | 11/2001 |
| WO | WO 00/68797 A1 | 11/2000 | | WO | WO 01/88705 A1 | 11/2001 |
| WO | WO 00/68902 A1 | 11/2000 | | WO | WO 02/06948 A1 | 1/2002 |
| WO | WO 00/68903 A1 | 11/2000 | | WO | WO 02/10962 A1 | 2/2002 |
| WO | WO 00/69183 A2 | 11/2000 | | WO | WO 02/14991 A2 | 2/2002 |
| WO | WO 00/75775 A2 | 12/2000 | | WO | WO 02/15037 A1 | 2/2002 |
| WO | WO 00/77750 A1 | 12/2000 | | WO | WO 02/21315 A1 | 3/2002 |
| WO | WO 01/04851 A1 | 1/2001 | | WO | WO 02/29577 A2 | 4/2002 |
| WO | WO 01/06341 A1 | 1/2001 | | WO | WO 02/088895 A2 | 11/2002 |

\* cited by examiner

METHOD AND SYSTEM FOR PROVIDING INTERACTIVE CARDHOLDER REWARDS IMAGE REPLACEMENT

BACKGROUND OF THE INVENTION

The present invention generally relates to card image replacement and, more specifically, to a method and system for managing card image replacement on a token via a computer network.

The emergence of secured tokens, such as smartcards, has allowed a much higher volume of information to be stored on a transaction card. For instance, in addition to the typical cardholder information, a smartcard is able to store a variety of different programs including, for example, a loyalty program of which the cardholder is a participant. Furthermore, unlike cards with magnetic stripes which can only retain static information, the use of a smartcard allows information stored thereon to be changed dynamically. As a result, there is often a need to update or replace contents of a smartcard.

Moreover, smartcards often need to be replaced for any number of reasons. Due to the transit time needed for replacement cards to reach their respective cardholders, these cards (such as a chip card that has the capability to receive updated information) generally do not contain the latest transaction information. This is because transactions conducted with the old card often occur during the transit period, i.e., the period between the issuance of the replacement card and the actual receipt of that card by its owner.

There are many different situations in which replacement cards are needed. One common situation is when an old card is about to expire. Typically when issuers, such as banks, replace a card, they do so by sending a replacement card to the cardholder in advance of the expiration date. Once the replacement card has been personalized and sent for delivery to the cardholder, there is a period of time that the cardholder may be conducting transactions on his/her existing card. In the case of a chip card, a cardholder may make transactions that result in information being stored on the chip during the time the replacement card is in transit. As a result, when the replacement card is delivered to the cardholder, the most recent transaction information would not be captured on the replacement card.

Another common situation in which a replacement card is desired is when a card has been lost or stolen. Similar to the situation described above, the replacement card would not contain the most recent transaction information. Furthermore, in the case of lost or stolen cards, unauthorized and/or illegal transactions may have occurred. Therefore, it would be important to include the correct authorized transaction information on the replacement card.

Under conventional practice, a replacement card does not always contains the latest information that the cardholder desires. Sometimes, the latest information that the cardholder wishes to store on the replacement card may not be available. For example, in existing card-based, offline loyalty programs, when an issued card reaches its expiration date, a new (replacement) card is typically sent to the cardholder in advance, normally one month prior to expiration. Activities continue on the old card while the new card is being prepared and mailed to the cardholder. In order to prepare the new card, the old card status is utilized when personalizing the new card, enabling the new card to be functional when it is delivered to the cardholder. During the period of time after the new card is prepared and the date when the cardholder receives the replacement (new) card, the cardholder may conduct incremental reward transactions using his/her old card, thereby causing the image stored within the old card to be updated and, therefore, out of sync with the image personalized on the new card. As a result, when the cardholder attempts to utilize the new card, one or more earned rewards may have been lost entirely or reward accumulations may have been lost, causing customer dissatisfaction and confusion.

Hence, it would be desirable to provide a method and system that is capable of facilitating card image replacement so as to allow replacement cards to be updated with the latest accurate transaction information in an intelligent and efficient manner.

BRIEF SUMMARY OF THE INVENTION

A system for facilitating image management for portable devices is disclosed. The system includes a host configured to maintain information relating to a first portable device and a second portable device and an interface device configured to communicate with the host and the first and second portable devices. The interface device includes control logic configured to: determine whether the first portable device is valid for image synchronization using information provided by the host; and if it is determined that the first portable device is valid for image synchronization, record an image of the first portable device, determine whether the second portable device is valid for image synchronization, and download an image of the first portable device to the second portable device if it is determined that the second portable device is valid for image synchronization.

The interface device further includes control logic configured to: determine whether the second portable device is valid for image replacement using information provided by the host, and if it is determined that the second portable device is valid for image replacement, retrieve an image of the first portable device and download the retrieved image to the second portable device.

The interface device also includes control logic configured to: determine whether the second portable device includes additional information that is not included in the image of the first portable device, and if it is determined that the second portable device includes the additional information, concatenate the additional information with the image of the first portable device, and download the concatenated additional information and image of the first portable device onto the second portable device. The interface device concatenates the additional information and the image of the first portable device based on a set of conflict resolution rules.

The present invention provides a number of advantages and benefits. For example, a cardholder would have more incentive to transfer his/her reward information to a new smartcard which, in turn, results in better customer satisfaction since the cardholder is able to more easily reap the rewards of his/her participation in loyalty programs. Most current loyalty programs maintain rewards through back-end systems and have longer duration such as annual expiration dates or greater, which does not impact card reissue. Card reissue provides a smartcard with an account number only. The real time concatenation and transfer of reward and multiple program information provided by the present invention becomes more relevant due to the numerous reward programs stored on one smartcard with varying expiration dates of potentially short duration.

Also, in most paper-based reward systems, the loss of a paper-based reward means the loss of the reward. The present invention allows rewards to be retained even if the smartcard that carries the current information relating to a reward program has been lost. This again results in better customer satisfaction since the cardholder will not feel that s/he has unjustly lost his/her rewards due to a lost or stolen smartcard.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
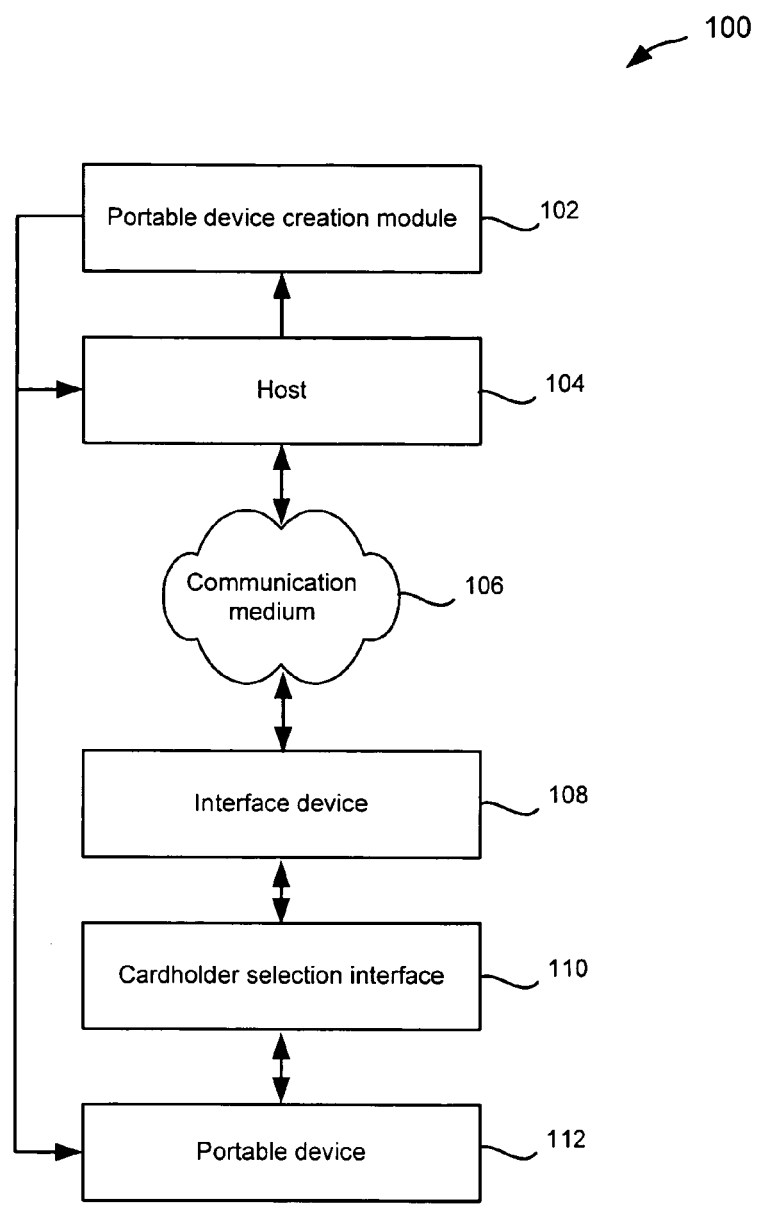
FIG. 1 is a simplified schematic diagram illustrating one exemplary embodiment of the present invention.

The present invention in the form of one or more exemplary embodiments will now be described. FIG. 1 is a simplified schematic diagram illustrating one exemplary embodiment of the present invention. In this exemplary embodiment, the system 100 includes a portable device creation module 102, a host 104, a communication medium 106, an interface device 108, a cardholder selection interface 110 and a portable device 112.

The host 104 can be any kind of computing device, such as, a server or the like. The host 104 cooperates with the portable device creation module 102 to create the portable device 112 for use in the system 100. The host 104 communicates with the interface device 108 via the communication medium 106. The communication medium 106 may be any kind of communication network, including but not limited to the Internet, a local area network (LAN), a wide area network (WAN), and a wireless network, etc. The interface device 108, in turn, communicates with the portable device 112 via the cardholder selection interface 110 to allow images to be replaced or updated on the portable device 112, as will be further described below. The interface device 106 can be, for example, a kiosk, a fixed workstation or a website, that is designed to allow a user to communicate with the host 104 to perform various functions as further described below. The portable device 112 includes smartcards, cellular phones, personal digital assistants (PDAs), pagers, payment cards, security cards, access cards, smart media, transponders, and the like.

In one exemplary application, the system 100 is deployed in connection with a loyalty/reward program. The system 100 allows a cardholder to activate image replacement for his/her smartcards. The system 100 includes a control application (or set of software components) residing within a kiosk or on a website that allows the cardholder to request and initiate synchronization of the rewards program images (RPIs) residing respectively on two smartcards that are in the possession of the cardholder. The first smartcard is an existing smartcard that is currently used by the cardholder for transactions associated with a loyalty program, and the second smartcard is a new smartcard that is sent to the cardholder. The second smartcard may be sent to the cardholder for a number of reasons including, for example, replacing the first smartcard or allowing the cardholder to have multiple smartcards for his/her use.

More specifically, the system 100 includes a card merge module (CMM) that enables the upload and/or download of card images to and from a smartcard, an application or applet on a smartcard capable of interacting with the kiosk or website, and appropriate user interface and device driver software.

When the cardholder visits the kiosk or website and selects the RPI synchronization option, the CMM performs the following functions where appropriate. First, the CMM authenticates a first (existing) smartcard supplied by the cardholder. The CMM also checks with the host 104 to determine if synchronization with the first smartcard is allowed. The host 104 maintains information relating to the number of synchronizations that can be performed for a smartcard or an account associated with the smartcard. In a situation where only one synchronization is allowed, if a previous synchronization has already been performed, then the CMM disallows the requested synchronization.

If synchronization is permitted, the CMM then further performs the following. The RPI of the first smartcard is recorded. The CMM then instructs the cardholder to insert the second (new) smartcard into a card acceptance device or card reader coupled to the kiosk or website. The second smartcard is then authenticated. As mentioned above, the second smartcard is sent to the cardholder for any one of a number of reasons. The host 104 maintains information relating to the second smartcard that is sent to the cardholder, thereby allowing authentication to be performed. Once the second smartcard is authenticated, the previously recorded RPI of the first smartcard is downloaded to the second smartcard. Where appropriate, the CMM may contact the host 104 to retrieve additional information, such as transaction history, for downloading to the second smartcard. The CMM then confirms the successful synchronization.

According to another exemplary aspect, the system 100 may also be used to provide RPI replacement for a new smartcard that has been issued as a replacement for a lost, stolen or damaged smartcard. In this situation, upon the cardholder selecting the RPI replacement option, the CMM performs an RPI replacement. The cardholder may provide the requisite information to allow the CMM to perform the RPI replacement. More specifically, the CMM first checks with the host 104 to determine if the requested RPI replacement is allowed. If the RPI replacement is allowed, the CMM then performs an online query to a central database for the purpose of downloading the most current copy of the RPI for the old smartcard. In one implementation, the query to the central database is effected through the host 104. Where appropriate, the CMM may also contact the host 104 to retrieve additional information. Once the copy of the desired RPI (and any additional information) is retrieved, the copy is stored by the CMM. The CMM then prompts the cardholder to insert the second the new replacement smartcard into the card acceptance device or card reader. The new replacement smartcard is then authenticated. If the authentication is successful, the CMM downloads a copy of the previously stored RPI and additional information, if appropriate, onto the new replacement smartcard and confirms the successful download.

As mentioned above, the CMM has the ability to evaluate and block the requested RPI synchronization or RPI replacement if such synchronization or replacement is not allowed.

In addition, the system 100 may further be used to provide a concatenation or merge of information between two smartcards during either the synchronization or replacement process.

Information from the new smartcard, the old smartcard and the host 104, where appropriate, is concatenated when information from the foregoing three entities do not overlap. In other words, corresponding information from the three entities, where appropriate, is combined to build the proper transaction history on the new smartcard. As will be discussed below, concatenation of information may be subject to conflict resolution rules or logic.

Information from the new smartcard, the old smartcard and the host 104, where appropriate, is merged when there is some overlap of information from the foregoing three entities. For example, all three entities may have different information relating to program accumulators or counters for the same loyalty program. Merging of information may include one or more of the following: merging two or more values to create a new value; and providing choices to the cardholder to, for example, select which program(s) s/he wants to delete or retain, merge or copy without change, choose not to install a program and merge programs that are unrelated.

In one illustrative example, the CMM has the ability to determine if the new smartcard has been used to perform any rewards transactions prior to its presentation for RPI synchronization or replacement. If the new smartcard has been used for transactions (meaning that the new smartcard contains new information that is not available on the old smartcard), then the CMM compares the respective RPIs on the old and the new smartcards to detect any differences. The detected differences represent new information that is on the new smartcard but not on the old one. The CMM then downloads a copy of the desired RPI (which generally is a copy of the RPI from the old smartcard) onto the new smartcard. Next, the CMM updates the new smartcard based on the detected differences to ensure that the new information previously stored on the new smartcard prior to its synchronization or replacement is restored and retained. For example, the CMM may add any rewards programs from the old RPI that are not present within the new RPI; and the CMM may update rewards programs that exist in both versions of the RPIs by summing the results of both (i.e., adding the redemptions and accumulation counters of both RPIs and recording the sum of both on the RPI of the new smartcard).

It should be understood that the concatenation or merge of information between two smartcards as described above can be performed according to one or more sets of predetermined conflict resolution rules or logic. For example, there may not be sufficient memory capacity on the new smartcard to store the old RPI from the old smartcard as well as the new information on the new smartcard. In this situation, the CMM may consult certain rules to eliminate information to accommodate the limited memory capacity of the new smartcard. For instance, the most recent information is retained first, which conversely means the oldest information is eliminated first. In another example, the respective RPIs from the new and the old smartcards may contain conflicting information. Similarly, the CMM may consult certain rules to resolve any such conflict. The rules and/or logic that can be used to provide the merge or concatenation of information as described above may take on many different forms depending on the specific applications. In some situations, input or selections may be requested from the cardholder to resolve any conflicts. Based on the disclosure and teachings provided herein, a person of ordinary skill in the art will appreciate how to design the desired rules and/or logic to implement the foregoing functions in accordance with the present invention.

Depending on the conflict resolution rules or logic, information from any two smartcards can be combined or concatenated. In one example, for smartcards with the same primary account number (PAN) but different cardholders, program balances can be combined as described above.

Moreover, the process of concatenating card images from an expired smartcard to a newly reissued smartcard can be tied to the activation function.

Furthermore, the CMM also has a mechanism that detects and reports when the new smartcard is removed from the card acceptance device or card reader before completion of the RPI synchronization or replacement process and when the desired RPI has not been successfully downloaded and/or updated. If the new smartcard is removed before completion of the RPI synchronization or replacement process or the desired RPI has not been successfully downloaded and/or updated, the RPI of the new smartcard is considered to be "torn" or otherwise corrupted. The foregoing process could then be used to perform repair of the RPI on the new smartcard.

Figure 2A:
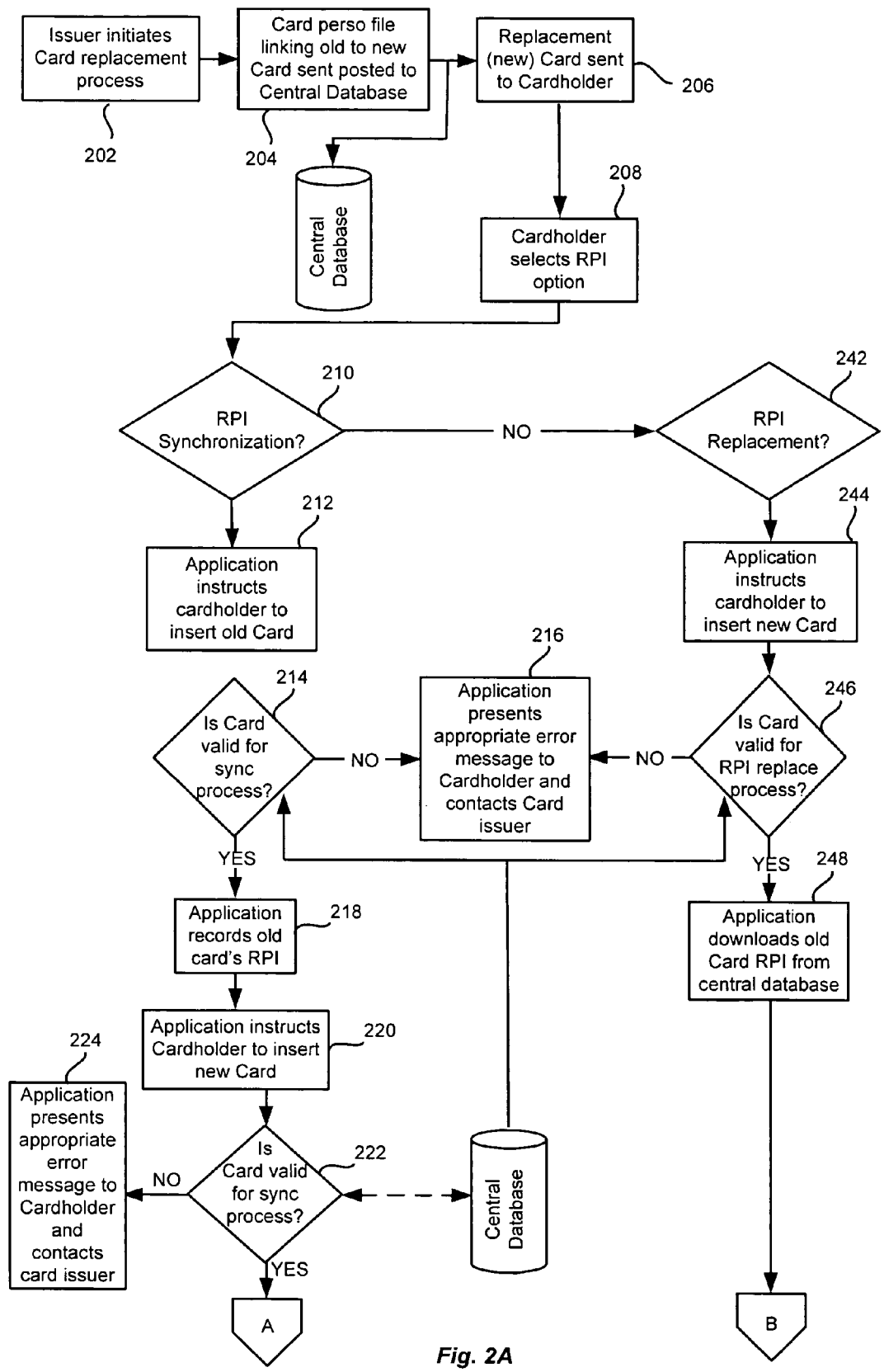
FIGS. 2A and 2B are flowcharts illustrating exemplary operations of one embodiment of the present invention.
Figure 2B:
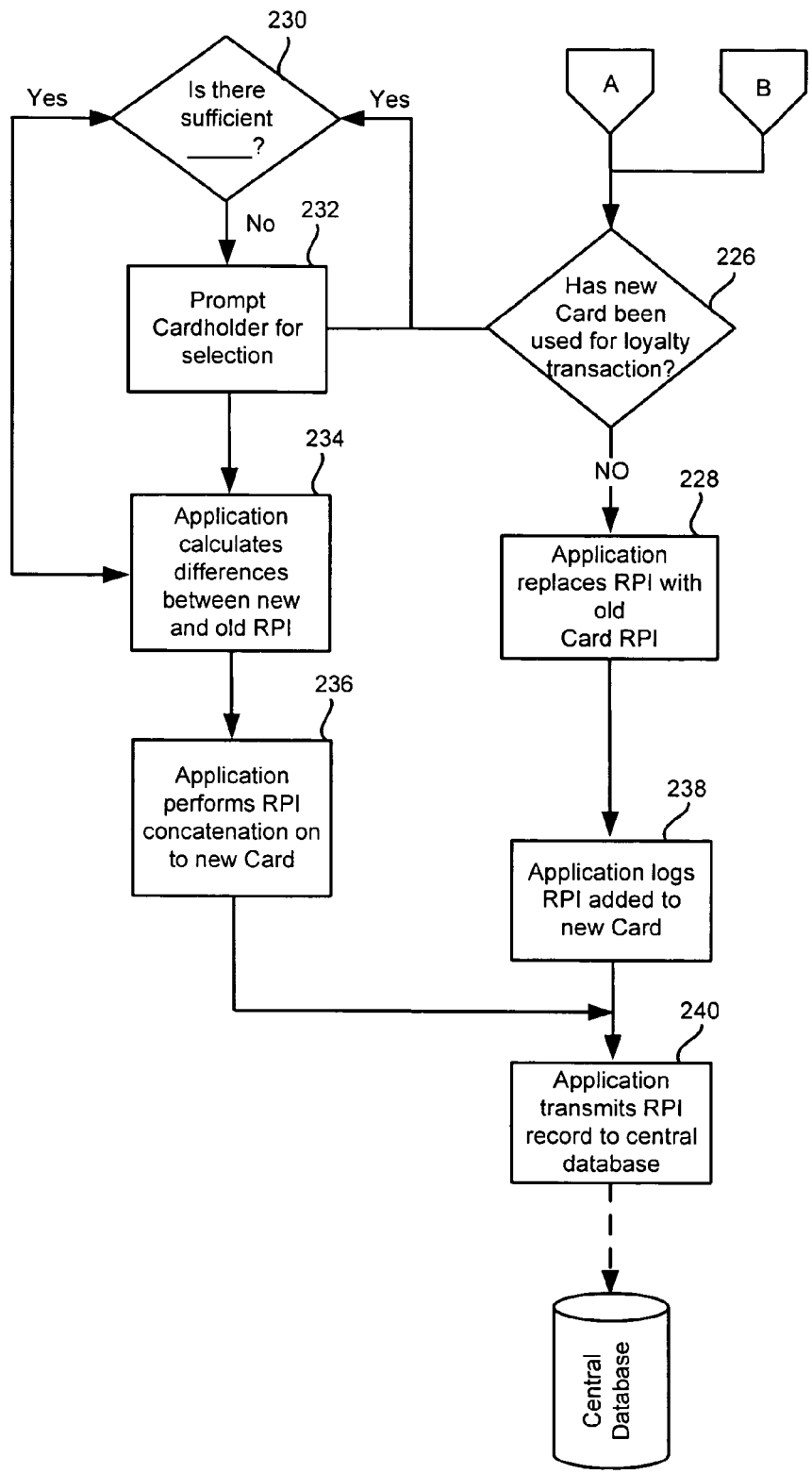

FIGS. 2A and 2B further illustrate exemplary operations of the system 100 according to one embodiment of the present invention. Referring to FIG. 2A, at 202, an issuer of a smartcard initiates a smartcard replacement process by, amongst other things, issuing a new smartcard. At 204, the new smartcard is linked to the old smartcard. The two smartcards may be linked based on a common loyalty account, the cardholder, or some other criteria. The linking information is stored in the central database. At 206, the new smartcard is forwarded to the cardholder.

At 208, when the cardholder selects the RPI synchronization or replacement option at a kiosk (or website). At 210, the application determines which of the two options has been selected. If the synchronization option has been selected, at 212, the application checks to see if the old smartcard is present in the card acceptance device or card reader and, if not, the application displays a request to the cardholder to insert the old smartcard. At 214, the application then determines if the old smartcard is valid. Such determination may be performed by authenticating the old smartcard. A person of ordinary skill will know of various well-know techniques and/or methods that can be used to perform the authentication. In addition, the old smartcard may not be valid for other reasons. For example, an authorized number of synchronizations with respect to the old smartcard have already been performed. If the old smartcard is not valid, an appropriate error message is displayed to the cardholder and the card issuer is contacted at 216.

At 218, if the old smartcard is valid, then the application records the old smartcard's RPI. At 220, the application instructs the cardholder to insert the new smartcard into the card acceptance device or card reader. At 222, the application determines whether the new smartcard is valid for synchronization. The new smartcard may not be valid for synchronization for a number of reasons. For example, the new smartcard is not linked to the old smartcard. At 224, if the new smartcard is not valid for synchronization, an appropriate error message is displayed to the cardholder and the card issuer is contacted.

Referring to FIG. 2B, at 226, the application then checks to see if the new smartcard has been used in a rewards transaction prior to the requested RPI synchronization. If the new smartcard has not been used in a rewards transaction, then at 228 the application downloads a copy of the previously stored RPI from the old smartcard onto the new smartcard. At 234, the application logs the RPI added to the new smartcard. At 236, the application transmits a record of the RPI synchronization process and a copy of the RPI currently stored on the new smartcard to the central database for archival and subsequent update purposes.

If it is determined that the new smartcard has been used in a rewards transaction, then at 230 the application determines whether there is sufficient room on the new smartcard to store the additional information relating to the rewards transaction. If there is sufficient room, at 234 the application calculates the differences between the respective RPIs of the old and the new smartcards. Using such differences, the application then at 236 performs the appropriate merge or concatenation and generates an updated RPI for the new smartcard. The merge or concatenation is performed based on certain rules and/or logic. If there is not sufficient room, i.e., if the combination of the two RPIs cannot be stored within the available internal memory of the new smartcard, the application then at 232 may provide the cardholder with a dialog box showing a list of all unique programs within both RPIs and enable the cardholder to select those programs that should be downloaded to the new smartcard. Alternatively, the application may provide the cardholder with the "best case" selection of the programs that are recommended for inclusion on the new smartcard. In another example, for any duplicated program (i.e., a program that appears on both the old and the new smartcards), the application sums the program information, where appropriate, such as program balances and redemption count, before loading the program to the new smartcard.

Once the merge or concatenation is completed, the application then similarly sends a record of the RPI synchronization process and a copy of the RPI currently stored on the new smartcard to the central database for archival and subsequent update purposes.

Optionally, once the final RPI has been written to the new smartcard, the application may allow the cardholder to obtain a listing of the concatenated information including, for example, a list of rewards programs remaining on the new smartcard with the updated balances.

Referring back to FIG. 2A, if the RPI synchronization option is not selected, then at 242 the application determines whether the RPI replacement option is selected. If it is determined that the replacement option is selected, then at 244 the application instructs the cardholder to insert the new smartcard. At 246, the application then checks to determine whether the new smartcard is valid for replacement purposes. Similarly, the new smartcard may not be valid for any one of a number of reasons. For example, the new smartcard may not be authenticated because the new smartcard is not linked to any old smartcard, or an authorized number of replacements have already been performed. If the new smartcard is not valid, then at 216 an appropriate message is displayed to the cardholder and the card issuer is contacted.

If the new smartcard is valid, then at 248 the application downloads a desired copy of an RPI (which generally is a copy of an RPI from the old smartcard) from the central database and temporarily stores that RPI in its internal memory. The same logic then follows as shown in FIG. 2B.

The present invention as described herein provides the capability for the cardholder to retain earned rewards by interactively performing the tasks of synchronizing, replacing or concatenating the RPI of his/her new smartcard with that of the old smartcard, regardless of whether the old smartcard is being replaced due to its loss, theft, re-issuance due to expiration or damage.

The present invention as described herein is applicable to various environments. In one environment, the present invention is used in connection with retail merchant and service organization payment systems that interface to a portable device such as a smartcard in the context of a transaction where the cardholder is provided with variable incentives or rewards when specific, desired purchase behaviors are performed.

The present invention can also be deployed in an environment where the interface between the portable device and the card acceptance device at an acceptance point is performed offline and critical rewards data, programs and/or parameters are electronically stored within the portable device in the form of an image. The present invention can be used in connection with a rewards/loyalty system that is designed in a network centric model, wherein an unrestricted number of cardholders, card issuers, acceptance point operators (merchants) and rewards sponsors may participate in a one common rewards program.

The present invention may also be implemented in different combinations of hardware and software than the ones described. Based on the disclosure and teachings provided herein, a person of ordinary skill in the art will know of other ways and/or methods to implement the present invention.

It should be understood that the embodiments provided are illustrative and not restrictive. Various other modifications are possible within the scope of the invention claimed. Moreover, while the description of the different embodiments are provided in the context of a loyalty program, a person of ordinary skill in the art would appreciate how to utilize the present invention in other applications or context where combining of information may be desirable.

What is claimed is:

1. A system for facilitating image management for portable devices, the system comprising:
   a host configured to maintain information relating to a first portable device and a second portable device; and
   an interface device configured to communicate with the host and the first and second portable devices, the interface device having control logic configured to
   determine whether the first portable device is valid for image synchronization using information provided by the host, and
   if the control logic determines that the first portable device is valid for image synchronization, record an image of the first portable device, determine whether the second portable device is valid for image synchronization, and download an image of the first portable device to the second portable device if the control logic determines that the second portable device is valid for image synchronization,
   wherein the first portable device is not valid for image synchronization if the control logic determines that an authorized number of image synchronizations has already been performed with respect to the first portable device.

2. The system of claim 1 wherein the interface device further includes control logic configured to:
   determine whether the second portable device is valid for image replacement using information provided by the host; and
   if the control logic determines that the second portable device is valid for image replacement, retrieve an image of the first portable device and download the retrieved image to the second portable device.

3. The system of claim 2 wherein the image of the first portable device is retrieved from a database via the host.

4. The system of claim 2 wherein the second portable device is not valid for image replacement if the control logic determines that the second portable device is not linked to the first portable device.

5. The system of claim 1 wherein the second portable device is not valid for image synchronization if the control logic determines that the second portable device is not linked to the first portable device.

6. The system of claim 1 wherein the first and second portable devices contain reward information relating to a loyalty program.

7. The system of claim 1 wherein the system is implemented using software, hardware or a combination of both.

8. The system of claim 1 wherein the first and second portable devices include smartcards.

9. A system for facilitating image management for portable devices, the system comprising:
   a host configured to maintain information relating to a first portable device and a second portable device; and
   an interface device configured to communicate with the host and the first and second portable devices, the interface device having control logic configured to
   determine whether the first portable device is valid for image synchronization using information provided by the host, and if the control logic determines that the first portable device is valid for image synchronization, record an image of the first portable device, determine whether the second portable device is valid for image synchronization, and download an image of the first portable device to the second portable device if the control logic determines that the second portable device is valid for image synchronization, wherein the interface device further includes control logic configured to determine whether the second portable device is valid for image replacement using information provided by the host, and if the control logic determines that the second portable device is valid for image replacement, retrieve an image of the first portable device and download the retrieved image to the second portable device, and wherein the interface device further includes control logic configured to
   determine whether the second portable device includes additional information that is not included in the image of the first portable device; and
   if the control logic determines that the second portable device includes the additional information, concatenate the additional information with the image of the first portable device, and download the concatenated additional information and image of the first portable device onto the second portable device.

10. The system of claim 9 wherein the interface device concatenates the additional information and the image of the first portable device based on a set of conflict resolution rules.

11. The system of claim 9 wherein the interface device further includes control logic configured to:
   forward the concatenated additional information and image of the first portable device downloaded onto the second portable device to the host.

12. A system for providing image synchronization for portable devices, the system comprising:
   a host configured to maintain information relating to a first portable device and a second portable device; and
   an interface device configured to communicate with the host, a user, and the first and second portable devices, the interface device having control logic configured to
   receive a synchronization request from the user, and
   in response to the synchronization request, determine whether the first portable device is valid for image synchronization using information provided by the host, and
   if the control logic determines that the first portable device is valid for image synchronization, record an image of the first portable device, determine whether the second portable device is valid for image synchronization, and download an image of the first portable device to the second portable device if the control logic determines that the second portable device is valid for image synchronization,
   wherein the first portable device is not valid for image synchronization if the control logic determines that an authorized number of image synchronizations have already been performed with respect to the first portable device.

13. The system of claim 12 wherein the second portable device is not valid for image synchronization if the control logic determines that the second portable device is not linked to the first portable device.

14. The system of claim 12 wherein the first and second portable devices contain reward information relating to a loyalty program.

15. The system of claim 12 wherein the system is implemented using software, hardware or a combination of both.

16. The system of claim 12 wherein the first and second portable devices include smartcards.

17. A system for providing image synchronization for portable devices, the system comprising:
   a host configured to maintain information relating to a first portable device and a second portable device; and
   an interface device configured to communicate with the host, a user, and the first and second portable devices, the interface device having control logic configured to receive a synchronization request from the user, in response to the synchronization request, determine whether the first portable device is valid for image synchronization using information provided by the host, and if the control logic determines that the first portable device is valid for image synchronization, record an image of the first portable device, determine whether the second portable device is valid for image synchronization, and download an image of the first portable device to the second portable device if the control logic determines that the second portable device is valid for image synchronization,
   wherein the interface device further includes control logic configured to
   determine whether the second portable device includes additional information that is not included in the image of the first portable device, and
   if the control logic determines that the second portable device includes the additional information, concatenate the additional information with the image of the first portable device, and download the concatenated additional information and image of the first portable device onto the second portable device.

18. The system of claim 17 wherein the interface device concatenates the additional information and the image of the first portable device based on a set of conflict resolution rules.

19. The system of claim 17 wherein the interface device further includes control logic configured to:
forward the concatenated additional information and image of the first portable device downloaded onto the second portable device to the host.

20. A system for providing image replacement for portable devices, the system comprising:
a host configured to maintain information relating to a first portable device and a second portable device; and
an interface device configured to communicate with the host, a user, and the first and second portable devices, the interface device having control logic configured to
receive a replacement request from the user,
in response to the replacement request, determine whether the second portable device is valid for image replacement using information provided by the host, and
if the control logic determines that the second portable device is valid for image replacement, retrieve an image of the first portable device and download the retrieved image to the second portable device,
wherein the second portable device is not valid for image replacement if the control logic determines that an authorized number of image replacements have been performed with respect to the first portable device.

21. The system of claim 20 wherein the image of the first portable device is retrieved from a database via the host.

22. The system of claim 20 wherein the second portable device is not valid for image replacement if the control logic determines that the second portable device is not linked to the first portable device.

23. The system of claim 20 wherein the first and second portable devices contain reward information relating to a loyalty program.

24. The system of claim 20 wherein the system is implemented using software, hardware or a combination of both.

25. The system of claim 20 wherein the first and second portable devices include smartcards.

26. A system for providing image replacement for portable devices, the system comprising:
a host configured to maintain information relating to a first portable device and a second portable device; and
an interface device configured to communicate with the host, a user, and the first and second portable devices, the interface device having control logic configured to
receive a replacement request from the user, and
in response to the replacement request, determine whether the second portable device is valid for image replacement using information provided by the host, and
if the control logic determines that the second portable device is valid for image replacement, retrieve an image of the first portable device and download the retrieved image to the second portable device,
wherein the interface device further includes control logic configured to
determine whether the second portable device includes additional information that is not included in the image of the first portable device, and
if the control logic determines that the second portable device includes the additional information, concatenate the additional information with the image of the first portable device, and download the concatenated additional information and image of the first portable device onto the second portable device.

27. The system of claim 26 wherein the interface device concatenates the additional information and the image of the first portable device based on a set of conflict resolution rules.

28. The system of claim 26 wherein the interface device further includes control logic configured to:
forward the concatenated additional information and image of the first portable device downloaded onto the second portable device to the host.

29. A method for facilitating image management for portable devices, the method comprising:
using a host to maintain information relating to a first portable device and a second portable device;
determining whether the first portable device is valid for image synchronization using information provided by the host; and
if the control logic determines that the first portable device is valid for image synchronization, recording an image of the first portable device, determining whether the second portable device is valid for image synchronization, and downloading an image of the first portable device to the second portable device if the control logic determines that the second portable device is valid for image synchronization,
wherein the first portable device is not valid for image synchronization if the control logic determines that an authorized number of image synchronizations has already been performed with respect to the first portable device.

30. The method of claim 29 further includes:
determining whether the second portable device is valid for image replacement using information provided by the host; and
if the control logic determines that the second portable device is valid for image replacement, retrieving an image of the first portable device and downloading the retrieved image to the second portable device.

31. The method of claim 30 wherein the image of the first portable device is retrieved from a database via the host.

32. The method of claim 30 wherein the second portable device is not valid for image replacement if the control logic determines that an authorized number of image replacements have been performed with respect to the first portable device.

33. The method of claim 30 wherein the second portable device is not valid for image replacement if the control logic determines that the second portable device is not linked to the first portable device.

34. The method of claim 29 wherein the second portable device is not valid for image synchronization if the control logic determines that the second portable device is not linked to the first portable device.

35. The method of claim 29 wherein the first and second portable devices contain reward information relating to a loyalty program.

36. The method of claim 29 wherein the method is implemented using software, hardware or a combination of both.

37. The method of claim 29 wherein the first and second portable devices include smartcards.

38. A method for facilitating image management for portable devices, the method comprising:
using a host to maintain information relating to a first portable device and a second portable device;
determining whether the first portable device is valid for image synchronization using information provided by the host; and
if the control logic determines that the first portable device is valid for image synchronization, recording an image of the first portable device, determining whether the second portable device is valid for image synchronization, and downloading an image of the first portable device to the second portable device if the control logic determines that the second portable device is valid for image synchronization, and wherein the method further comprises determining whether the second portable device is valid for image replacement using information provided by the host, and if the control logic determines that the second portable device is valid for image replacement, retrieving an image of the first portable device and downloading the retrieved image to the second portable device, and wherein the method further comprises determining whether the second portable device includes additional information that is not included in the image of the first portable device, and if the control logic determines that the second portable device includes the additional information, concatenating the additional information with the image of the first portable device, and downloading the concatenated additional information and image of the first portable device onto the second portable device.

39. The method of claim 38 wherein the additional information and the image of the first portable device are concatenated based on a set of conflict resolution rules.

40. The method of claim 38 further comprising:
forwarding the concatenated additional information and image of the first portable device downloaded onto the second portable device to the host.

41. A method for providing image replacement for portable devices, the method comprising:
using a host to maintain information relating to a first portable device and a second portable device;
receiving a replacement request from a user;
in response to the replacement request, determining whether the second portable device is valid for image replacement using information provided by the host; and
if the control logic determines that the second portable device is valid for image replacement, retrieving an image of the first portable device and downloading the retrieved image to the second portable device,
wherein the second portable device is not valid for image replacement if the control logic determines that an authorized number of image replacements has been performed with respect to the first portable device.

42. The method of claim 41 wherein the second portable device is not valid for image replacement if the control logic determines that the second portable device is not linked to the first portable device.

43. The method of claim 41 wherein the first and second portable devices contain reward information relating to a loyalty program.

44. The method of claim 41 wherein the method is implemented using software, hardware or a combination of both.

45. The method of claim 41 wherein the first and second portable devices include smartcards.

46. A method for providing image replacement for portable devices, the method comprising:
using a host to maintain information relating to a first portable device and a second portable device;
receiving a replacement request from a user;
in response to the replacement request, determining whether the second portable device is valid for image replacement using information provided by the host; and
if the control logic determines that the second portable device is valid for image replacement, retrieving an image of the first portable device and downloading the retrieved image to the second portable device, and wherein the method further comprises,
determining whether the second portable device includes additional information that is not included in the image of the first portable device, and
if the control logic determines that the second portable device includes the additional information, concatenating the additional information with the image of the first portable device, and downloading the concatenated additional information and image of the first portable device onto the second portable device.

47. The method of claim 46 wherein the additional information and the image of the first portable device are concatenated based on a set of conflict resolution rules.

48. The method of claim 46 further comprising:
forwarding the concatenated additional information and image of the first portable device downloaded onto the second portable device to the host.

49. The method of claim 46 wherein the image of the first portable device is retrieved from a database via the host.

50. A method for facilitating image management for portable smartcards, the method comprising:
maintaining information relating to a first portable smartcard and a second portable smartcard;
determining whether the first portable smartcard is valid for image synchronization; and
determining whether the second smartcard is valid for image synchronization, and downloading an image of the first portable smartcard to the second portable smartcard if the control logic determines that the second portable smartcard is valid for image synchronization,
wherein the first and second smartcards contain loyalty information and wherein the first and second portable smartcards belong to the same person.

51. The method of claim 50 wherein the second portable smartcard is not valid for image replacement if the control logic determines that the second portable smartcard is not linked to the first portable device.

52. The method of claim 50 wherein the method is implemented using software, hardware or a combination of both.

53. The method of claim 50 wherein the control logic is present on an interface device configured to communicate with the first and second portable smartcards.

* * * * *